United States Patent [19]
Ohgaki et al.

[11] Patent Number: 5,441,995
[45] Date of Patent: Aug. 15, 1995

[54] ELECTRODEPOSITION PAINT COMPOSITION CONTAINING POLYSILOXANE-POLYALKYLENEOXIDE BLOCK COPOLYMERS

[75] Inventors: Atsushi Ohgaki, Neyagawa; Hiroharu Ohsugi, Hirakata; Hisaki Tanabe, Yawata; Kenshiro Tobinaga, Hiroshima; Yoshio Kojima, Nara, all of Japan

[73] Assignee: Nippon Paint Co., Ltd., Osaka, Japan

[21] Appl. No.: 254,882

[22] Filed: Jun. 6, 1994

[30] Foreign Application Priority Data

Jun. 8, 1993 [JP] Japan .................... 5-164080

[51] Int. Cl.6 ............... C09D 5/44; C09D 163/00
[52] U.S. Cl. ........................ 523/404; 523/415; 523/423; 523/425; 524/265; 524/837; 524/838
[58] Field of Search ............. 523/404, 423, 425, 415; 524/265, 837, 838

[56] References Cited

U.S. PATENT DOCUMENTS

| | | | |
|---|---|---|---|
| 3,305,504 | 2/1967 | Huntington | 528/38 |
| 3,555,063 | 1/1971 | Nakajima et al. | 525/474 |
| 3,556,754 | 1/1971 | Marsden et al. | 525/477 |
| 3,922,253 | 11/1975 | Jerabek et al. | 523/415 |
| 4,225,479 | 9/1980 | Hicks | 528/120 |

FOREIGN PATENT DOCUMENTS

| | | |
|---|---|---|
| 2265834 | 3/1975 | France . |
| 4153206 | 5/1992 | Japan . |

*Primary Examiner*—Frederick Krass
*Attorney, Agent, or Firm*—Townsend & Banta

[57] ABSTRACT

The present invention provides a paint film with fewer craters and indentations, while maintaining performance as an electrodeposition paint. The electrodeposition paint composition contains an aqueous dispersing system containing an electrodepositable resin and a block polymer containing polysiloxane units and polyalkylene oxide units.

5 Claims, No Drawings

ELECTRODEPOSITION PAINT COMPOSITION CONTAINING POLYSILOXANE-POLYALKYLENEOXIDE BLOCK COPOLYMERS

FIELD OF THE INVENTION

This invention relates to an electrodeposition paint composition which provides a film with fewer craters and indentations compared with conventional products, while maintaining performance as an electrodeposition paint.

BACKGROUND OF THE INVENTION

When coating is conducted using an electrodeposition paint, the obtained film sometimes has craters and indentations. One of the causes for this may be, for example, residual rust preventive oil which had been applied on the steel plate substrate. A possible scenario follows: when the film is formed by means of electrodeposition on the steel plate with some rust preventive oil still remaining on it and baking is conducted, residual oil drops and moisture in the electrodeposition paint or from a chemical conversion coating process, come together as a result of heating, and resulting oil drops thus splash and fall on the film surface.

To prevent such a phenomenon, various additives are known to be added to electrodeposition paint compositions. For example, Japanese unexamined patent publication (Tokkai) Sho 58-25326 and Tokkai Hei 2-4826 discloses process(es) in which a resin containing a polyepoxide and a polyoxyalkylene is added.

However, electrodeposition paint compositions to which conventional additives are added can deteriorate the appearance of the electrodeposition paint compositions because the added resin has a high molecular weight.

The object of this invention is to provide an electrodeposition paint composition which gives a film with fewer craters and indentations, while maintaining performance as an electrodeposition paint.

SUMMARY OF THE INVENTION

The electrodeposition paint composition of this invention contains an aqueous dispersing system comprising an electrodepositable resin and a block polymer containing polysiloxane units and polyalkylene oxide units.

The aqueous dispersing system used in this invention contains as an essential component an electrodepositable resin. This aqueous dispersing system itself can be used as an electrodeposition paint.

For the electrodepositable resin, which is an essential component of the aqueous dispersing system, there are the anion types and the cation types, of which the cation types are preferable. Examples of suitable cation type resins are amine modified resins, resins containing sulphonium groups, and resins containing phosphonium groups. Of these, amine modified resins are generally used and preferable. Examples of suitable amine modified resins include, for example, amine modified epoxy resins, amine modified polyurethane polyol resins, amine modified polybutadiene resins and amine modified acrylic resins. Of these, the amine modified epoxy resins are preferable.

The amine modified epoxy resins are generally obtained by using primary, secondary or tertiary amines to modify novolak resins and/or polyglycidyl ethers manufactured from bisphenol A, bisphenol F and epihalohydrin. Specific examples include resins used for the Powertop U series electrodeposition paints from Nippon Paint Co., Ltd.

DETAILED DESCRIPTION OF THE INVENTION

The aqueous dispersing system can contain, if necessary, hardening agents, catalysts, other resins, pigments and other additives. Examples of the hardening agents include melamine resins, benzoguanamine resins, phenol resins and block isocyanate compounds. Examples of suitable catalysts include manganese, cobalt, copper, lead and tin compounds. Examples of the other suitable resins are resins without functional groups which would give electric charges and hydrophilicity, such as epoxy acrylate resins. The addition of these resins can further improve the film performance. For the pigments, coloring pigments, extender pigments, rust preventive pigments, etc. can be used. Examples of suitable coloring pigments are titanium dioxide, iron oxide red and carbon black. Examples of suitable extender pigments are kaolin, aluminum silicate, precipitated barium sulfate, silica and precipitated calcium carbonate. Examples of the rust preventive pigments are aluminum phosphomolybdate, strontium chromate, basic lead silicate and lead chromate. Examples of the other additives are surfactants, such as defoaming agents, and ultraviolet absorbents.

The aqueous dispersing system used in this invention can be obtained by dispersing said electrodepositable resin and other components in an aqueous medium. The aqueous medium used here is a mixture of water and an water-miscible organic solvent. If necessary, the aqueous medium may contain a non-water-miscible organic solvent as well. Examples of the water-miscible organic solvent include ethylcellosolve, propylcellosolve, butylcellosolve, ethylenegylcol dimethyl ether, diacetone alcohol, 4-methoxy-4-methylpentanon-2 and methyl ethyl ketone. Examples of non-water-miscible organic solvents include xylene, toluene, methyl isobutyl ketone and 2-ethyl hexanol.

In order to disperse the electrodepositable resin into the aqueous medium, an acid or base, as a neutralizer, is added to the cation electrodeposition type or the anion electrodeposition type, respectively. Examples of suitable acids include phosphoric acid, acetic acid, propionic acid and lactic acid. Examples of suitable bases are tertiary amines such as triethylamine and tri-n-butylamine.

The block polymer used in this invention is a polymer in which units with specific repeating components are linearly bonded. This block polymer is added to said aqueous dispersing system.

The polysiloxane units contained in this block polymer are represented by the following formula:

In this formula, $R_1$ and $R_2$ are alkyl groups with a carbon number of 1-8, allyl groups with a carbon number of 6-10, or aralkyl groups with a carbon number of 7-9, and n is an integer equal to or larger than 2. $R_1$ and $R_2$ can be either identical or different.

For the polysiloxane units, polydimethyl siloxane, polymethyl phenyl siloxane and polymethyl propyl siloxane are preferable. The number average molecular weight of the polysiloxane units is preferably from about 100–5000, and more preferably from about 300–2000. If the molecular weight is below about 100, then the reduction in craters and indentations will not be sufficient. If it is above about 10000, then there may be adverse effects on other film characteristics.

Examples of the polyalkylene oxide units are polymethylene oxide, polyethylene oxide, polypropylene oxide and polytetramethylene oxide. Of these, polyethylene oxide is preferable. The number average molecular weight of the polyalkylene oxide units is preferably from about 100–10000, and more preferably from about 200–4000. If the molecular weight is below about 100, then there may be adverse effects on the top coat adhesion. If it is above 10000, then the reduction in craters and indentations will not be sufficient.

The block polymer used in this invention has polysiloxane units and polyalkylene oxide units, and it is preferable that two or more of each unit is contained in each molecule. The types of the polysiloxane units can be either identical or different. Also, the types of the polyalkylene oxide units can be either identical or different. As anyone skilled in the art would appreciate, such block copolymers can be expressed by the formula $(A-B)_n$, where A is a polysiloxane block and B is a polyoxyalkylene oxide block. These block copolymers preferably have a number average molecular weight in the range of 1,000–30,000.

Said block polymer is synthesized through a reaction between a polymer with polysiloxane units and a polymer with polyalkylene oxide units. Specifically, the block polymer is obtained by an esterification reaction between a dibasic acid and a polyol compound or a polyepoxy compound. As one skilled in the art world appreciate, in such a product A and B in the aforementioned formula would be linked directly by an ester linkage.

An example of the dibasic polymer containing polysiloxane units used in such a reaction is alpha, omega-carboxyl polydimethyl siloxane. Specific examples include X-22-162A with a number average molecular weight of 1840 and X22-162C with a number average molecular weight of 4660 (both from Shin-Etsu Chemical Co., Ltd.).

An example of the dibasic polymer containing polyalkylene oxide units is alpha, omega- carboxyl polyethylene oxide. Specific examples include PEO acid No. 400 with a number average molecular weight of 400 and PEO acid No. 1000 with a number average molecular weight of 1000 (Both from Kawaken Fine Chemical Co., Ltd.).

An example of the polyol compound containing polysiloxane units is alpha, omega-hydroxy polydimethyl siloxane. Specific examples include X-22-160 AS with a number average molecular weight of 900, KF-6001 with a number average molecular weight of 1680, KF-6002 with a number average molecular weight of 3000 and KF-6003 with a number average molecular weight of 4600 (all from Shin-Etsu Chemical Co., Ltd.).

Examples of the polyol compound containing polyalkylene oxide units include polyethylene glycol 200 with a number average molecular weight of 190–210, polyethylene glycol 300 with a number average molecular weight of 285–315, polyethylene glycol 400 with a number average molecular weight of 380–420, polyethylene glycol 600 with a number average molecular weight of 570–630, polyethylene glycol 1000 with a number average molecular weight of 950–1050, polyethylene glycol 1500 with a number average molecular weight of 1400–1600, polyethylene glycol 2000 with a number average molecular weight of 1800–2200, and polyethylene glycol 3000 with a number average molecular weight of 2700–3400.

An example of the polyepoxy compound containing polysiloxane units is alpha, omega-diepoxy-polydimethylsiloxane. Specific examples include KF-105 with a number average molecular weight of 980, X-22-163 A with a number average molecular weight of 1900 and X-22-163 A with a number average molecular weight of 3520 (all from Shin-Etsu Chemical Co., Ltd.).

An example of the polyepoxy compound containing polyalkylene oxide units is polyethylene glycol glycidyl ether. Specific examples include Denacol EX-851 with a number average molecular weight of 218, Denacol EX-832 with a number average molecular weight of 438, Denacol EX-841 with a number average molecular weight of 614 and Denacol EX-861 with a number average molecular weight of 1010 (all from Nagase Chemicals).

When the polymer containing polysiloxane units is a dibasic acid polymer, the polymer containing polyalkylene oxide units is chosen from among polyol compounds and polyepoxy compounds. On the other hand, when the polymer containing polyalkylene oxide units is a dibasic acid polymer, the polymer containing polysiloxane units is chosen from among polyol compounds and polyepoxy compounds.

When carrying out these reactions, polyol compounds and/or dibasic acid compounds and/or polyepoxy compounds other than those mentioned above can be used in addition. Examples of such polyol compounds are 1, 6-hexanediol, neopentyl glycol and trimethylol propane. Examples of such dibasic acid compounds are phthalic anhydride, isophthalic acid, terephthalic acid, adipic acid and azelaic acid. An example of such a polyepoxy compound is bisphenol A glycidyl ether.

When carrying out the reaction between the dibasic acid polymer and the polyol compound, catalysts can be used to accelerate the reaction. Specifically, common ester exchange catalysts such as dibutyl tin dilaurate, dibutyl tin oxide and p-toluenesulfonic acid can be used.

In the electrodeposition paint composition of this invention, the amount of said block polymer added is preferably about 0.01–3.0 wt % of the solid of said aqueous dispersing system. The expression "solid" in this invention denotes the remainder of said aqueous dispersing system after removing the weight of the solvent(s) and the neutralizer(s).

If the block polymer content is below about 0.01 wt %, then the reduction in craters and indentations will not be sufficient. If it is above about 3.00 wt %, then there may be adverse effects on other film characteristics. Any method can be used for adding it.

The electrodeposition paint composition of this invention can be used, for example, for automobile bodies and parts. The nonvolatile content of the paint is adjusted to approximately 10–20%, and the electrodeposition is carried out to have a dry film thickness of about 15–30 micrometers. Hardening can be conducted by means of room temperature hardening, thermal hardening, ultraviolet hardening, electron beam hardening, etc., according to the resin type.

EXAMPLES

Concrete description of this invention is given below by referring to examples. In the examples, "parts" and "%" are based on weight.

Preparation Example 1

Preparation of the epoxy-type cationic resin dispersion fluid (1) Preparation of the first fluid 970 parts of epoxy resin Epon 1001 (from Shell Chemical Company) with an epoxy equivalent of 485 and 265 parts of polycaprolactonediol PCP0200 (from Union Carbide Corporation; believed to be a polymer with a number average molecular weight of approximately 543 obtained by the ring-opening reaction of epsilon-caprolactone by using ethylene glycol) were supplied to a reaction vessel. This was heated to 100° C. in nitrogen atmosphere, and 0.46 parts of benzyldimethylamine was added. The reaction mixture was further heated up to 130° C., kept at this temperature for 1 hour, then cooled down to 110° C. To this, 110 parts of methyl isobutyl ketone was added, then 39.8 parts of methyl isobutyl ketimine (methyl isobutyl ketone-block-diethylenetriamine) methyl isobutyl ketone solution (73%), and then 100 parts of methyl isobutyl ketone were added. The temperature was lowered to 70° C., and, at this temperature, 53.1 parts of diethylamine was added. The vessel was kept for 3 hours in a 120° C. bath and the content was taken out (nonvolatile content 85%).

(2) Preparation of the second fluid

In an atmosphere of dry nitrogen, 218 parts of 2-ethylhexanol was added to 291 parts of a 80/20 (weight ratio) mixture of 2, 4-/2, 6-toluenediisocyanate in another reaction vessel. The reaction temperature was maintained at 38° C. by means of cooling from outside. Then, after holding the temperature for 30 minutes, the temperature was raised to 60° C. and 75 parts of trimethylol propane was added, followed by 0.08 parts of dibutyl tin laurate, the catalyst. The reaction temperature was kept at 121° C. After 1.5 hours, the disappearance of absorption by isocyanate was confirmed by IR spectroscopy, and thus the reaction was completed. 249 parts of ethyleneglycol monoethylether was added for dilution (nonvolatile content 70%).

(3) Preparation of the cationic resin dispersion fluid 576 parts of the first fluid and 217 parts of the second fluid, prepared as above, were mixed, neutralized with 12.3 parts of glacial acetic acid, and gradually diluted with 705.5 parts of deionized water. To this, 39 parts of ethyleneglycol monohexylether and 283.1 parts of deionized water were added to obtain the epoxy-type cationic resin dispersion fluid with a solid content of 35.7%.

Preparation Example 2

Preparation of the acrylic type cationic resin dispersion fluid (1) Preparation of the third fluid 45 parts of ethyleneglycol monohexylether was supplied to a reaction vessel equipped with a reflux condenser, a dripping funnel, an agitator and a thermometer, and heated to 120° C. Into this, a mixture containing 20 parts of styrene, 30 parts of 2-hydroxyethylmethacrylate, 35 parts of ethylacrylate, 15 parts of dimethylaminoethylmethacrylate, 3 parts of t-dodecylmercaptane and 0.2 parts of azobisisobutyronitrile was dripped over 2 hours. After the completion of this dripping, the temperature was kept at 120° C. for 30 minutes, and a mixture containing 5 parts of ethyleneglycol monohexylether and 0.2 parts of azobisisobutyronitrile was dripped over 5 minutes. The temperature was then kept at 120° C. for 1 hour to obtain an acrylic copolymer solution with a solid content of 68% and a number average molecular weight of approximately 10000.

(2) Preparation of the cationic resin dispersion fluid 155.2 parts of the third fluid, prepared as described above, and 37.6 parts of the second fluid from Preparation Example 1 were mixed, and neutralized with 2.3 parts of glacial acetic acid. This was gradually diluted by adding 243.2 parts of deionized water to obtain an acrylic type cationic resin dispersion fluid with a solid content of 30%.

Preparation Example 3

Preparation of the resin vehicle for dispersing the pigment (1) Preparation of the quarternarization-agent At room temperature, 320 parts of 2-ethyl-1-hexanol-block-TDI methyl isobutyl ketone solution (solid content 304 parts) was added to 87.2 parts of dimethylethanolamine, and generation of heat was observed. This was agitated for 1 hour at 80° C., and then 117.6 parts (solid content 88.2) of an aqueous solution of lactic acid was added, followed by 39.2 parts of butylcellosolve. Agitation was conducted for approximately 30 minutes at 65° C. to obtain the quarternarization-agent.

(2) Preparation of the resin vehicle 710.0 parts of Epon 829 (bisphenol A-type epoxy resin with an epoxy equivalent of 193–203, from Shell Chemical Company) and 289.6 parts of bisphenol A were supplied to a reaction vessel, and heated to 150°–160° C. in a nitrogen atmosphere to carry out the reaction for approximately 1 hour. After the temperature was lowered to 120° C., 406.4 parts of 2-ethyl-1-hexanol-block-TDI methyl isobutyl ketone solution (solid content 386.1 parts) was added, and the temperature was kept at 110°–120° C. for approximately 1 hour. To this, 567.6 parts of butyl cellosolve was added, and, after cooling down to 85°–95° C., 71.2 parts of deionized water was added, followed by the quarternarization-agent prepared as described above. The reaction mixture was then kept at 80°–85° C. until the acid number became 1, and thus the resin vehicle for pigment dispersion with a nonvolatile content of 70% was obtained.

Preparation Example 4

Preparation of the pigment paste 429 parts of deionized water was added to 1000 parts of the resin vehicle prepared in Preparation Example 3, and then 40 parts of kaolin, 180 parts of carbon black, 100 parts of lead silicate and 80 parts of dibutyl tin oxide were added, followed by agitation and mixing for approximately 30 minutes using a disperser. Glass beads were then added and a sand mill was used to disperse the product to have a particle size of 15 micrometers or less. The glass beads were then filtered away to obtain a pigment paste with a nonvolatile content of 50%.

Preparation Example 5

Synthesis of the block polymer solution (A)

68.9 parts of X-22-160AS (alpha, omega-hydroxydimethyl siloxane; with a number average molecular weight of 900, from Shin-Etsu Chemical Co., Ltd.), 30.2 parts of PEO acid No. 400 (made of alpha, omega-carboxypolyethylene oxide; with a number average molecular weight of 400, from Kawaken Fine Chemical Co., Ltd.), 1.0 part of trimethylol propane and 0.05 parts of dimethyl tin oxide were supplied to a reaction vessel equipped with a heating device, an agitator, a refluxing device, a water separator, a fractionating column and a thermometer, and the temperature was raised to 200° C. in 3 hours. The dehydration reaction started at approximately 170° C., and the system appeared clear at 200° C.

The temperature of the reaction system was then raised from 200° C. to 210° C. in 4 hours. After this, the acid number of the system measured 13.3. The reaction system was then cooled down to 120° C. 2 parts of xylene was added, followed by a dehydration reaction while refluxing for approximately 5 hours. The reaction was ended when the acid number of the reaction system reached 5.0 mgKOH/g-solid (with a dehydrated amount of 2.4 cc), resulting in a clear block polymer solution (A) (with a nonvolatile concentration of 93.0%, a viscosity of 3840 cp (25° C.), a hydroxyl group number of 13.5 mgKOH/g-solid, and a number average molecular weight of 5600 (by GPC)).

Preparation Example 6

Synthesis of the block polymer solution (B)

48.7 parts of X-22-160AS, 50.4 parts of PEO acid No. 1000 (from Kawaken Fine Chemical Co., Ltd.), 1.0 part of trimethylol propane and 0.05 parts of dimethyl tin oxide were supplied to a reaction vessel just like the one used in Preparation Example 5, and a reaction just like the one carried out in Preparation Example 5 was carried out. The dehydrated amount in this reaction was 1.7 cc. 35 parts of xylene was added to the obtained polymer solution to obtain a block polymer solution (B) (with a number average molecular weight of 6840, a nonvolatile concentration of 69.9%, and a viscosity of 563 cp (25° C.)).

Preparation Example 7

Synthesis of the block polymer solution (C)

43.1 parts of alpha, omega-carboxyldimethyl siloxane X-22-162AS (with a number average molecular weight of 1840, from Shin-Etsu Chemical Co., Ltd.), 46.9 parts of polyethylene glycol 1000 (with a number average molecular weight of 950–1050), 3.9 parts of isophthalic acid and 0.05 parts of dimethyl tin oxide were supplied to a reaction vessel just like the one used in Preparation Example 5, and a reaction just like the one carried out in Preparation Example 5 was carried out to obtain a slightly white cloudy polymer-solution. To this, 35 parts of xylene was added to obtain a block polymer solution (C) (with a nonvolatile concentration of 70.1%, a viscosity of 1280 cp (25° C.), a hydroxyl group number of 8.8 mgKOH/g-solid, and a number average molecular weight of 13500).

Preparation Example 8

Synthesis of the block polymer solution (D)

12.7 parts of PEO acid No. 400 and 0.5 parts of dimethylbenzylamine were supplied to a reaction tank equipped with a heating device, an agitator, a refluxing device, a water separator, a fractionating column and a thermometer, and heated up to 150° C. 62.0 parts of KF-105 (alpha, omega-diepoxy-polydimethylsiloxane with a number average molecular weight of 980, from Shin-Etsu Chemical Co., Ltd.) was dripped at a constant rate over 3 hours. After completion of this dripping, 25.3 parts of PEO acid No. 400 was dripped at a constant rate over 1 hour. The temperature was then kept at 150° C. for 2 hours to obtain a clear block polymer solution (D) (with a nonvolatile concentration of 96.2%, a viscosity of 1230 cp (25° C.), a hydroxyl group number of 36.1 mgKOH/g-solid, and a number average molecular weight of 3150).

EXAMPLE 1

450.0 parts of the resin dispersion fluid from Preparation Example 1, 130.0 parts of the resin paste from Preparation Example 4, 419.3 parts of deionized water and 0.7 parts of the block polymer solution (A) from Preparation Example 5 (0.3% of the solid) were mixed to obtain an epoxy-type cation electrodeposition paint with a solid content of 20%.

EXAMPLE 2

450.0 parts of the resin dispersion fluid from Preparation Example 2, 130.0 parts of the resin paste from Preparation Example 4, 419.3 parts of deionized water and 0.9 parts of the block polymer solution (B) from Preparation Example 6 (0.3% of the solid) were mixed to obtain an 25 acrylic cation electrodeposition paint with a solid content of 20%.

EXAMPLE 3

450.0 parts of the resin dispersion fluid from Preparation Example 1, 130.0 parts of the resin paste from Preparation Example 4, 419.3 parts of deionized water and 0.9 parts of the block polymer solution (C) from Preparation Example 7 (0.3% of the solid) were mixed to obtain an epoxy-type cation electrodeposition paint with a solid content of 20%.

EXAMPLE 4

450.0 parts of the resin dispersion fluid from Preparation Example 2, 130.0 parts of the resin paste from Preparation Example 4, 419.3 parts of deionized water and 0.7 parts of the block polymer solution (D) from Preparation Example 8 (0.3% of the solid) were mixed to obtain an acrylic cation electrodeposition paint with a solid content of 20%.

Comparative Example 1

An epoxy-type cation electrodeposition paint was obtained by the same procedure as Example 1 except for the fact that the block polymer solution (A) was not added.

Comparative Example 2

An acrylic cation electrodeposition paint was obtained by the same procedure as Example 2 except for the fact that the block polymer solution (B) was not added.

Evaluation 0.01% lubricant oil (Noxrust 320 from Parker Kohsan) was added to each paint from Examples 1–4 and Comparative Examples 1 and 2. A steel plate, treated with zinc phosphate, was immersed in a paint bath with the bath temperature adjusted to 28° C. By using this as a cathode, electrodeposition was conducted for 3 minutes at 200 V. After water rinsing, it was baked at 170° C. for 30 minutes to obtain an electrodeposited film with a film thickness of 20 micrometers. For this film, the following measurements were conducted: the number of craters which had developed on the painted surface (7×15 cm) measured by visual observation; the surface flatness Ra (in micrometers) measured by using a surface roughness meter Surtronik 3P from Talor-Hobson; the top coat adhesion measured with the cut tape peeling method after painting and baking of a top coat (OTO-630 from Nippon Paint Co., Ltd.) (peeling observed circle, peeling not observed). The results are shown in Table 1 below.

TABLE 1

| Item | Example 1 | Example 2 | Example 3 | Example 4 | Comparative Example | Comparative Example |
|---|---|---|---|---|---|---|
| Number of Craters | 0 | 0 | 0 | 0 | 10 | 10 |
| Surface Flatness | 0.25 | 0.30 | 0.25 | 0.30 | 0.25 | 0.30 |
| Top Coat Adhesion | ◯ | ◯ | ◯ | ◯ | ◯ | ◯ |

What is claimed is:

1. An electrodeposition paint composition having an aqueous dispersing system comprising an electrodepositable resin and a block polymer represented by the formula:

(A−B)$_n$ wherein A is a polysiloxane unit having a number average molecular weight of from about 100–5,000, B is a polyalkylene oxide unit having a number average molecular weight from about 100–10,000, and n is an integer equal to or greater than 2, and wherein A and B are directly linked by an ester linkage said block polymer having a number average molecular weight of from about 1,000–30,000, and said block polymer's concentration being from about 0.01–3.00 wt. % of the solid of said aqueous dispersing system.

2. The electrodeposition paint composition of claim 1, said electrodepositable resin comprises an amine modified epoxy resin.

3. An electrodeposition paint composition of claim 1, wherein the aqueous dispersing system comprises water and a water-miscible organic solvent.

4. An electrodeposition paint composition of claim 1, wherein said electrodepositable resin is selected from the group consisting of amine modified epoxy resins, amine modified polyurethane polyol resins, amine modified polybutadiene resins and amine modified acrylic resins.

5. An electrodeposition paint composition of claim 1, wherein said polysiloxane units contained in the block polymer are represented by the following formula:

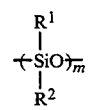

wherein $R^1$ and $R^2$ are alkyl groups having 1–8 carbon atoms, allyl groups having 6–10 carbon atoms, or aralkyl groups having 7–9 carbon atoms, m is an integer equal to or larger than 2, and $R^1$ and $R^2$ are either identical or different.

* * * * *